United States Patent
Tyus, II

(10) Patent No.: US 9,856,968 B2
(45) Date of Patent: Jan. 2, 2018

(54) AUTOMATIC TRANSMISSION DEVICE

(71) Applicant: Thurman Tyus, II, Cleveland, OH (US)

(72) Inventor: Thurman Tyus, II, Cleveland, OH (US)

(\*) Notice: Subject to any disclaimer, the term of this patent is extended or adjusted under 35 U.S.C. 154(b) by 131 days.

(21) Appl. No.: 14/536,682

(22) Filed: Nov. 10, 2014

(65) Prior Publication Data

US 2015/0128760 A1     May 14, 2015

Related U.S. Application Data

(60) Provisional application No. 61/902,278, filed on Nov. 10, 2013.

(51) Int. Cl.
    *F16H 57/02*     (2012.01)
    *F16H 57/023*     (2012.01)
    *F16H 57/00*     (2012.01)

(52) U.S. Cl.
    CPC ... *F16H 57/023* (2013.01); *F16H 2057/0068* (2013.01); *F16H 2057/0235* (2013.01); *F16H 2057/02047* (2013.01); *Y10T 74/2186* (2015.01)

(58) Field of Classification Search
CPC .......... F16H 57/023; F16H 2057/0068; F16H 2057/02047; F16H 2057/0235; F16H 57/0441; Y10T 74/2186
See application file for complete search history.

(56) References Cited

U.S. PATENT DOCUMENTS

| | | | | |
|---|---|---|---|---|
| 3,166,018 A * | 1/1965 | Stedman, Jr. | ............ | F04C 2/101 418/170 |
| 4,699,023 A * | 10/1987 | Bajulaz | .................... | F16H 25/06 475/162 |
| 5,657,666 A * | 8/1997 | Tsuda | .................. | B29C 45/0025 248/604 |
| 8,850,910 B1 * | 10/2014 | Have | .................... | F16H 57/0484 241/32 |
| 2015/0075323 A1 * | 3/2015 | House | ................. | F16H 57/0441 74/606 R |
| 2015/0107388 A1 * | 4/2015 | Yajima | .................. | F16H 57/023 74/412 R |
| 2016/0215862 A1 * | 7/2016 | Telep | .................... | F16H 19/005 |

\* cited by examiner

*Primary Examiner* — Adam D Rogers

(57) ABSTRACT

An automatic transmission device comprises a flat steel plate for placing in between an automatic transmission pump body and an automatic transmission bellhousing that supports both rotating pump gears and completely encloses said gears within pump housing, and eleven holes, the device configured so that seven holes are for pump mounting bolts, three holes are for fluid passage that directly mimic the size, shape, dimension and position of the holes in the pump body, and one center hole for pump gear operation.

2 Claims, 8 Drawing Sheets

AUTOMATIC TRANSMISSION DEVICE

The present invention relates to an Automatic Transmission Device.

BACKGROUND

The automatic transmission is an apparatus used in motor vehicles. Its purpose is to transmit power from the internal combustion engine to the wheels. The 722.6 is Mercedes Benz's five speed automatic transmission while the 722.9 is Mercedes Benz's seven speed automatic transmission.

In the 722.6 and 722.9 automatic transmissions, there is a set of two steel pump gears that rotate and are responsible for hydraulic pressure for transmission operation. These two pump gears often break. When they break, they cause damage to the surface area of an aluminum or magnesium bellhousing on which they rotate.

A prior art supposedly protects a good bellhousing from being damaged. However, because it is inherently weaker in construction, the prior art is not to be used for damaged bellhousings. Furthermore, the prior art does not completely support both rotating pump gears.

Additionally, the prior art does not completely enclose both pump gears within a pump gear housing to ensure no further damage is possible to a bellhousing.

For example, FIG. 1 shows a prior art 24 design. The prior art has a thin rim 26 on which the inner pump gear 20 rotates. FIG. 3 shows a larger view of the thin rim 26. Additionally, the prior art 24 lacks total outer gear support and containment as is shown by the gaps 28 that are circled.

As a result, FIG. 1, FIG. 3 and FIG. 7 shows the prior art as being a weaker design.

SUMMARY

The present invention seeks to provide a solution to this problem by providing an automatic transmission device, comprising: a flat steel plate for placing inside a transmission bellhousing; and eleven holes, the device configured so that seven of the eleven holes are pump mounting bolts, three of the eleven holes are for fluid passage and one of the eleven holes is for pump gear operation.

When the automatic transmission device is inserted into a damaged bellhousing, the device completely covers a damaged surface area providing a smooth solid base upon which both pump gears rotate.

Furthermore, the automatic transmission device completely encloses both gears within a pump gear housing which insures no further bellhousings damage.

BRIEF DESCRIPTION OF THE SEVERAL VIEWS OF THE DRAWINGS

The present invention will now be more particularly described with reference to the accompanying drawings, by way of example only and in no way limiting the scope of the invention in which.

DETAILED DESCRIPTIONS OF THE INVENTION

Figure 1:
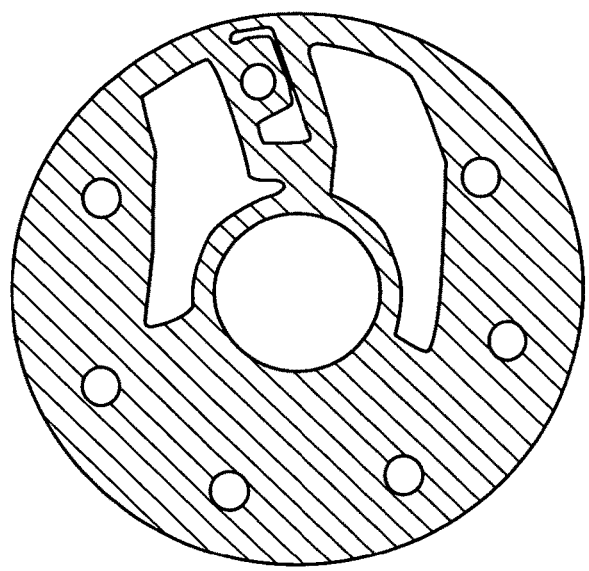
FIG. 1 is a top view of the prior art with very large inlet, outlet and drain back holes

Referring to the drawings, there is shown an automatic transmission device 10 comprising: a flat steel plate 11 for placing between an automatic transmission bellhousing and an automatic transmission pump housing, and area on the plate 13 that is solid and fully supports and encloses both pump gears 20, 22 within an automatic transmission pump housing and eleven holes 12, 14, 16, 18 the device configured so that seven of the eleven holes 12 are for pump mounting bolts, three of the eleven holes 16, 14 are for fluid passage that directly mimic the size, shape, dimension and position of the transmission pump body and one of the eleven holes 18 is for pump gear 20, 22 operation.

The flat plate 11 is made from preferably mild steel. Although it 11 can be made from various other qualified metals. The plate 11 can be made of hardened metal. In addition, the shape of said plate 11 is preferably round to match the diameter of a bellhousing pump pocket.

The outer diameter of said plate 11 is preferably 151.98 mm. The thickness of said plate 11 is preferably 18 gauge. However, it may be possible to have a thinner or thicker gauge.

The automatic transmission device 10 has a full surface area 13 that completely encloses the inner and outer pump gear 20, 22 within a pump housing.

Figure 8:
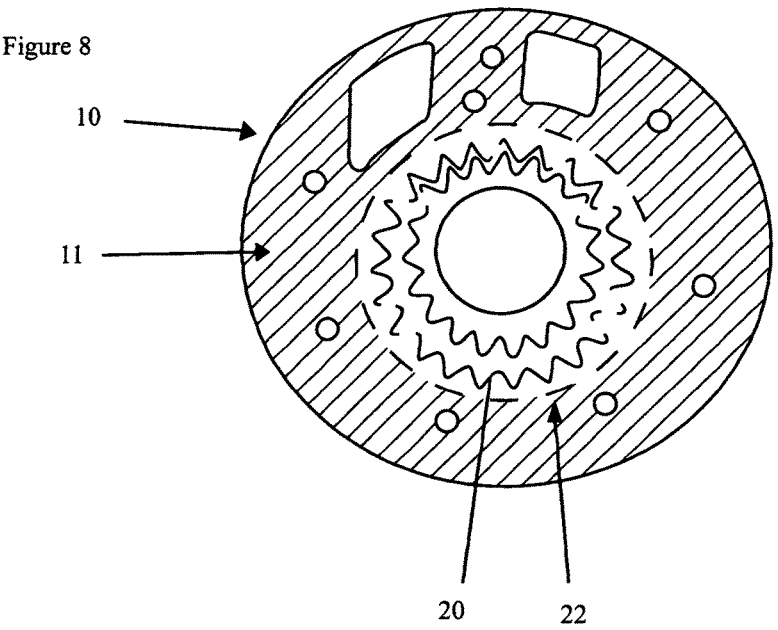
FIG. 8 is a bottom view of the automatic transmission device with inner and outer pump gears on the bottom
Figure 9:
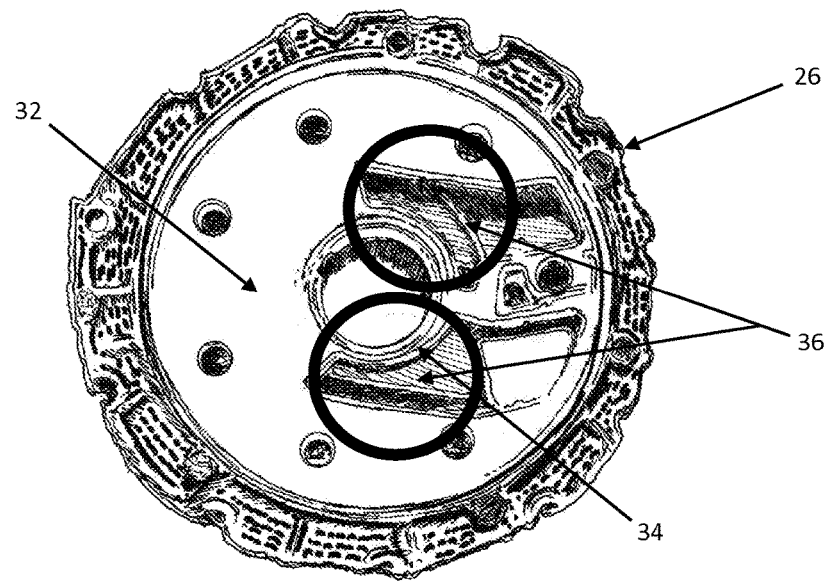
Figure 10:
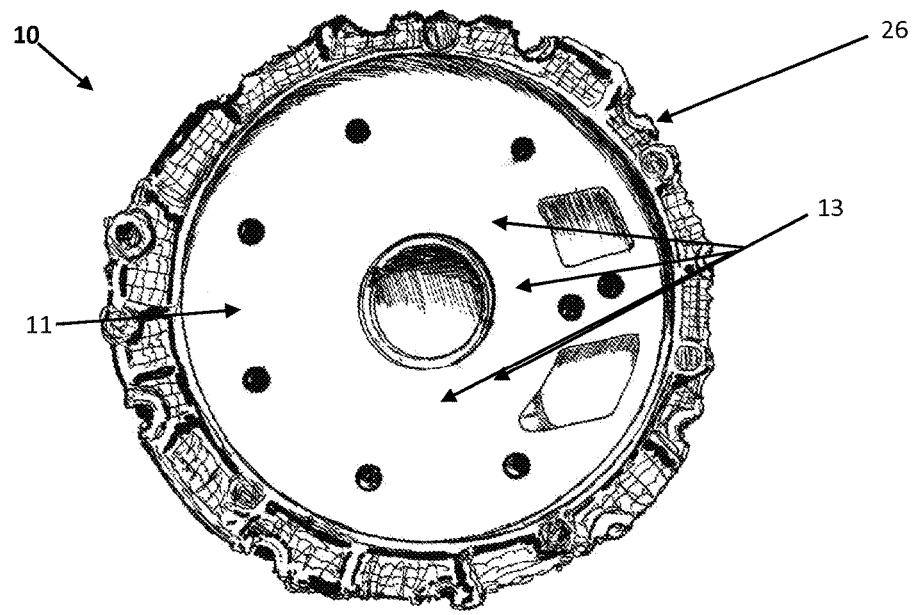
Figure 11:
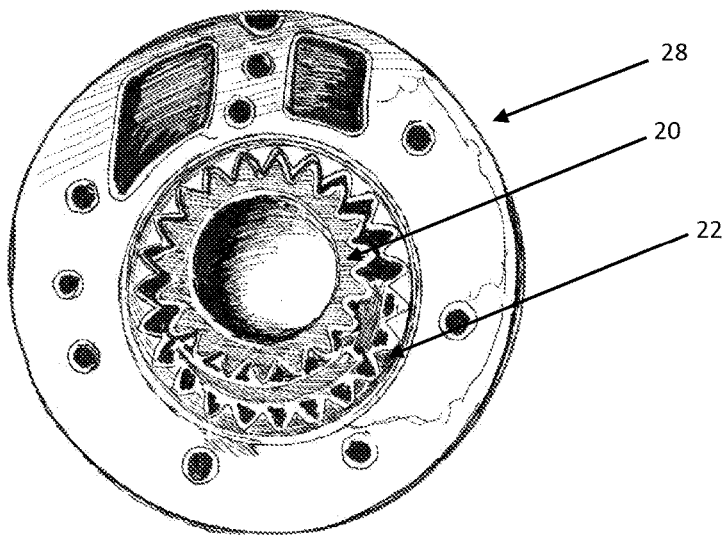
Figure 12:
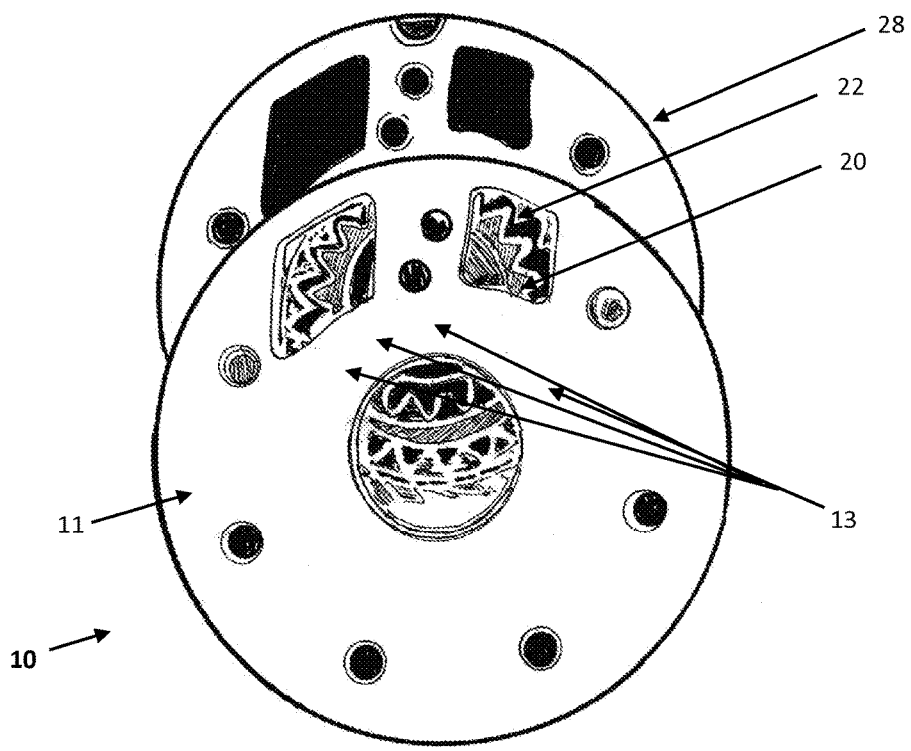
Figure 13:
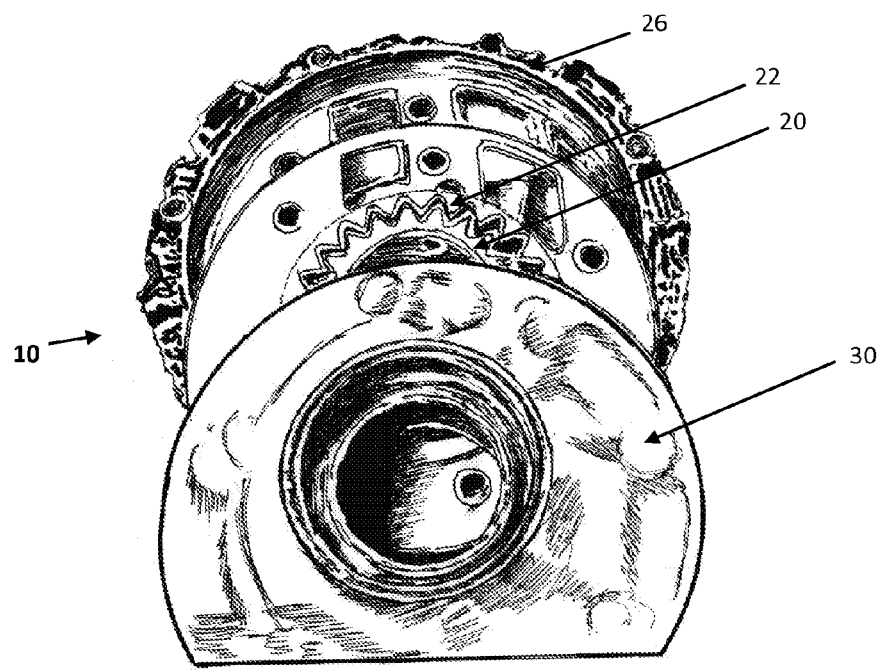
Figure 14:
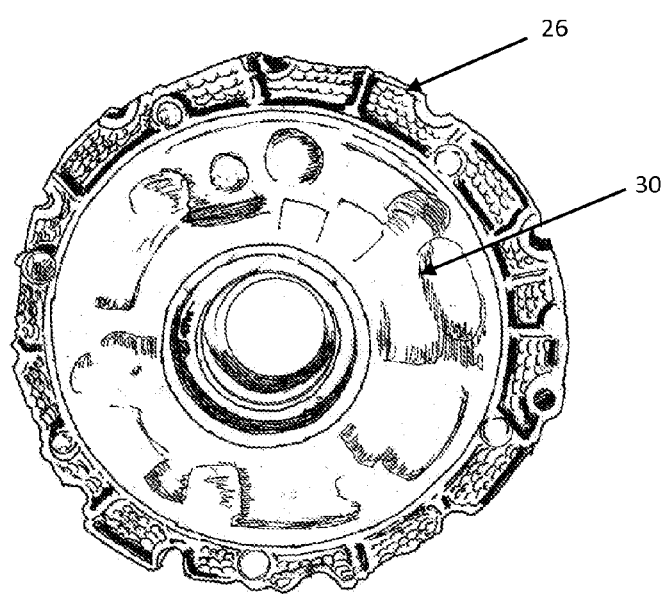

FIG. 8 shows fully supported and completely enclosed pump gears 20, 22 as is indicated by the dotted lines. Furthermore, the dotted lines in FIG. 8 represents the hidden pump gears 20, 22. There are no gaps or open areas. The pump gears 20, 22 are fully contained.

Figure 7:
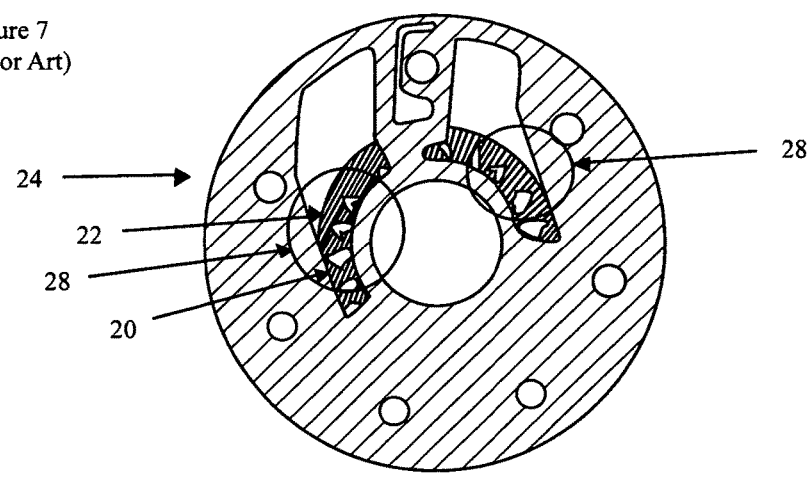
FIG. 7 is a bottom view of the prior art with inner and outer pump gears on the bottom

In figures that show a back of the automatic transmission device 10 and a back of the prior art device 24 where the pump gears are not visible (for example FIG. 7 and FIG. 8), the pump gears 20, 22 are represented by dashed lines to facilitate undestanding od the invention 10.

Because of the solid surface area 13, the automatic transmission device 10 can be placed into a damaged bellhousing of a 722.6 or 722.9 transmission so that the bellhousing can be reused.

Figure 2:
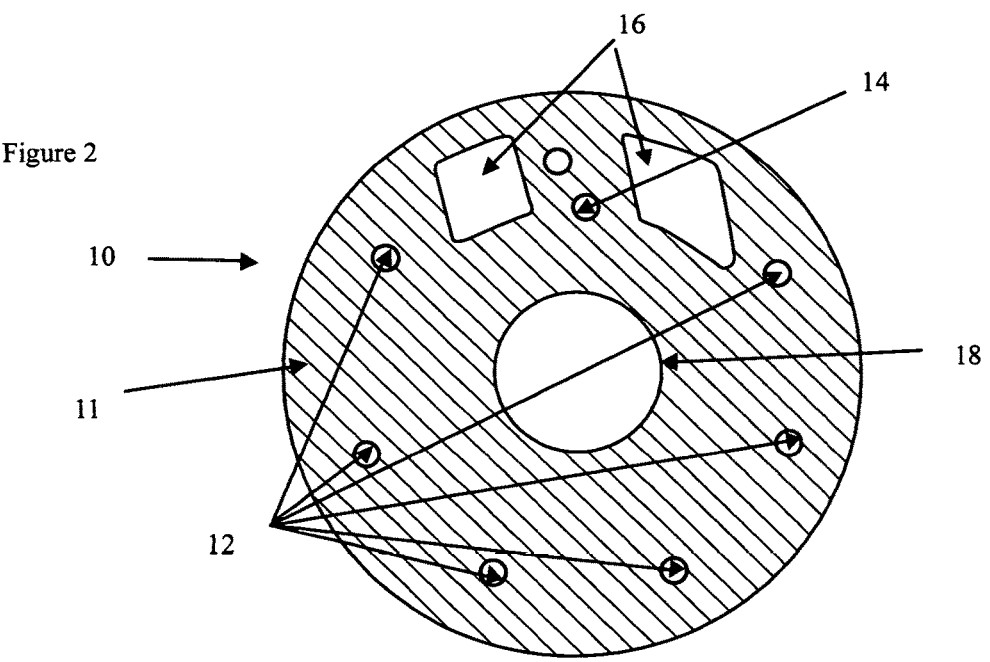
FIG. 2 is a top view of the automatic transmission device with small inlet, outlet and drain back holes
Figure 3:
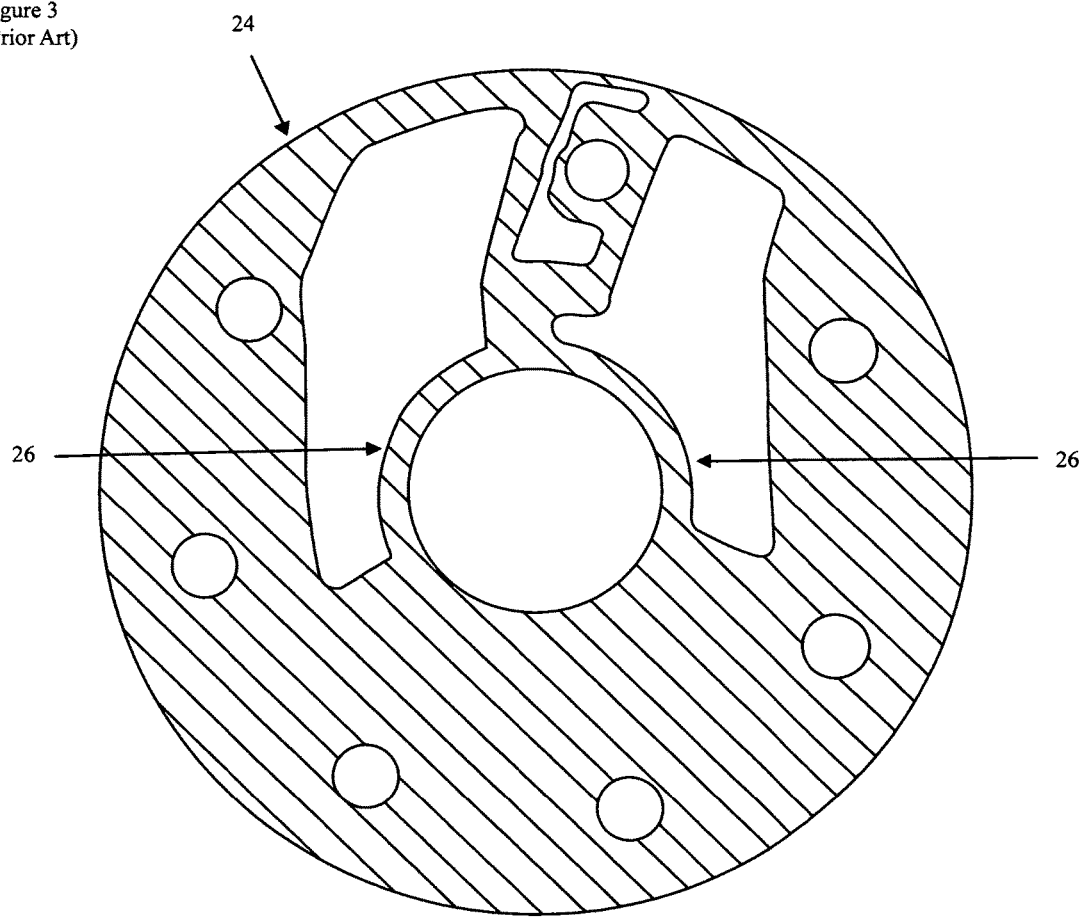
FIG. 3 is a top view of the prior art and the area that supports pump gear operation
Figure 4:
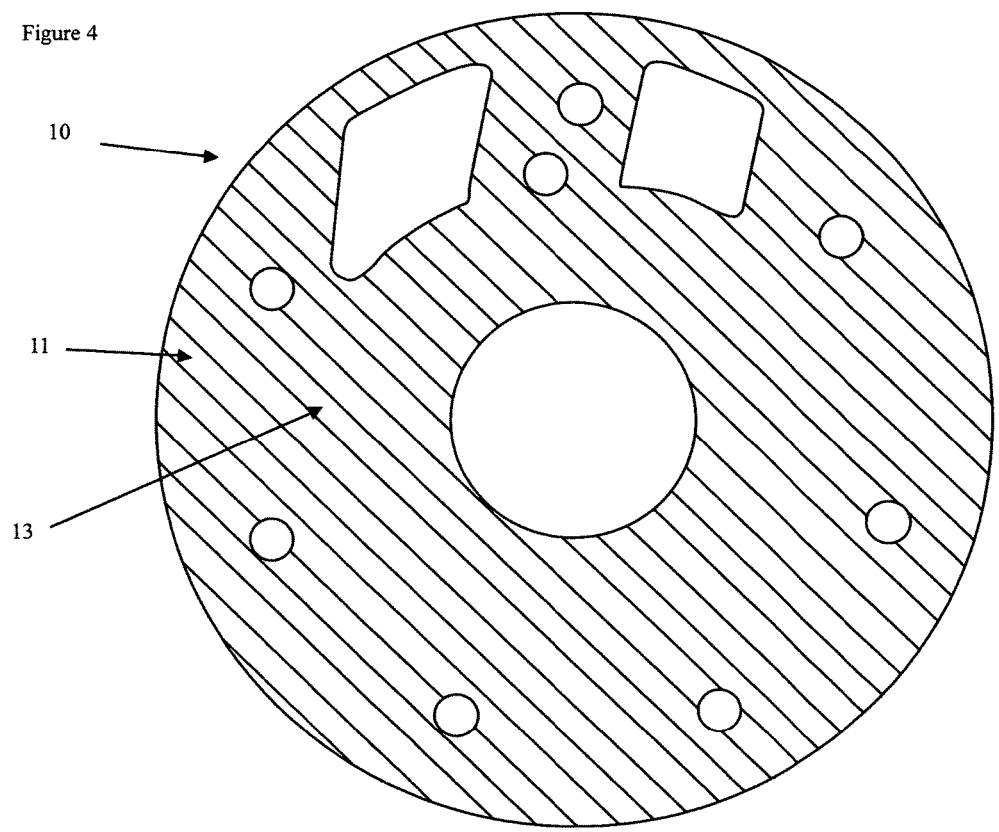
FIG. 4 is a top view of the automatic transmission device and the area that supports pump gear operation
Figure 5:
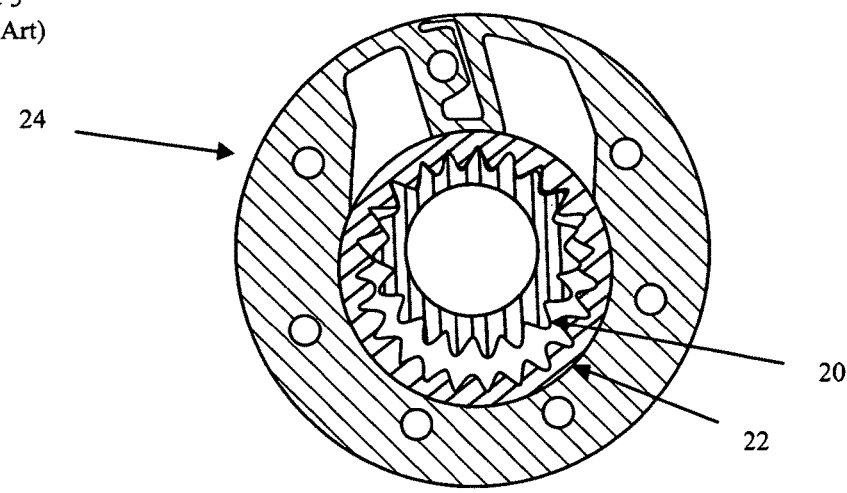
FIG. 5 is a top view of the prior are with inner and outer pump gears on top
Figure 6:
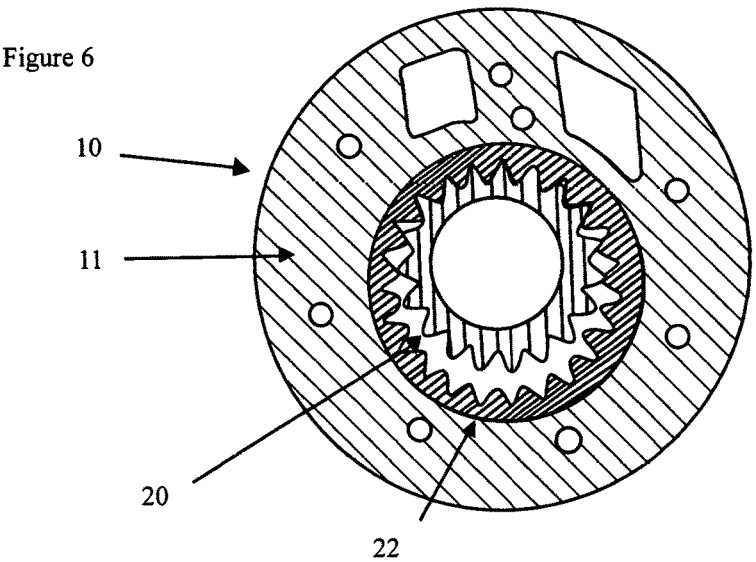
FIG. 6 is a top view of the automatic transmission device with inner and outer pump gears on top

As shown in FIG. 2, the automatic transmission device 10 has eleven holes 12, 14, 16, 18. Seven holes are pump bolt holes 12 and are for allowing a 722.6 or 722.9 transmission bellhousing to be attached to a 722.6 or 722.9 transmission pump housing. The seven pump bolt holes 12 are preferably 8.75 mm in diameter. The pump bolt holes 12 are preferably round although they could be oval, square or other shapes. One hole is the front seal drain back hole 14. It is also round, and is the same size, shape and in the exact same position as the drain back hole in in the 722.6 and 722.9 transmission pump housing. The other two holes are the pump inlet and pump outlet holes 16. These holes are the same size, shape and in the exact same position as the holes in the 722.6 and 722.9 transmission pump housing. The last hole is the center hole 18 of the automatic transmission device. It is for the operation of the pump gears 20, 22. It is preferably 20 mm in diameter.

Preferably, the automatic transmission device 10 is made from metal although it may be made from hard chemically treated plastics. Preferably, the automatic transmission device 10 is used for reclaiming or reusing a damaged 722.6 or 722.9 Mercedes Benz automatic transmission bellhousing. However, it could be used to protect a good 722.6 or 722.9 bellhousing from damage when the pump gears 20, 22 break. Also, the automatic transmission device 10 can be used as a replacement surface of a badly worn 722.6 or 722.9 transmission bellhousing when placed in a bellhousing pocket.

The invention will now be described in use, with reference to a preferred embodiment, in no way limiting a scope of the invention.

In use, a 722.9 automatic transmission is brought into a transmission shop to be repaired. When the automatic transmission is disassembled, it is discovered that the pump gears and the bellhousing on which the pump gears rotate are damaged. Although the pump gears are easily replaceable, the bellhousing is not. The user reaches for the automatic transmission device, places it into the damaged bellhousing pocket, replaces the pump gears and reassembles the transmission.

As a result of the automatic transmission device, the additional savings to the customer is the cost of a bellhousing.

The embodiments described above are provided by way of example only and various other modifications will be apparent to persons skilled in the art without departing from the scope of the invention as defined in the appended claims.

The invention claimed is:

1. An automatic transmission device, comprising:
a flat plate for placing between an automatic transmission pump body and an automatic transmission bellhousing;
a pump inlet hole formed in the flat plate, wherein the pump inlet hole has the same shape, size, dimension and position as a pump inlet hole in the pump housing,
a pump outlet hole formed in the flat plate, wherein the pump outlet hole has the same shape, size, dimension and position as a pump outlet hole in the pump housing,
a pump drain back hole formed in the flat plate, wherein the pump drain back hole has the same shape, size, dimension and position as the pump outlet hole in the pump housing.

2. The automatic transmission device as claimed in claim 1, wherein the pump inlet hole, the pump outlet hole, and the pump drain back hole of the flat plate do not partially or completely eliminate an area that completely encloses an inner gear and an outer pump gear within the pump housing.

* * * * *